United States Patent Office 3,264,236
Patented August 2, 1966

3,264,236
p-TOLYLENE DIISOCYANATE MODIFIED POLYESTER POLYMER AND METHOD OF MAKING THE SAME
Anthony F. Santaniello, Trenton, N.J., assignor to Thiokol Chemical Corporation, Bristol, Pa., a corporation of Delaware
No Drawing. Filed June 22, 1959, Ser. No. 821,634
4 Claims. (Cl. 260—22)

This invention relates to liquid polymers of the type that are suitable for use in the compounding of solid propellants and more particularly to certain isocyanate modified-polyesters which in their cured form are especially useful as fuel-binders in the manufacture of solid propellants.

Solid propellant rocket motors are commonly made by preparing a mixture of a finely divided inorganic oxidizing agent, a liquid polymer, a curing agent for the polymer and minor amounts of various modifying ingredients; introducing the resulting composition into a motor casing; and curing the mixture in situ to form a solid propellant charge within the motor. The cured polymer acts both as a fuel for reaction with the oxidizing agent and as a binder to provide the propellant charge with the desired physical properties.

Liquid polymers to be used for this purpose must meet numerous different requirements. Thus they must mix readily with the necessary quantity of organic oxidizer to form a composition that is sufficiently flowable for satisfactory casting in the motor casing. In their role of fuel they should have as high a heat of combustion as possible and desirably a high ratio of hydrogen to carbon. In their role as binder they should desirably be curable without significant dimensional changes to a rubbery material of good physical strength. The resilience and tensile strength of the cured polymer are important in achieving a propellant grain capable of withstanding physical shock without fracturing, and also in reducing the possibility of crack formation due to differential thermal expansion during combustion of the propellant.

One general type of polymer that has been proposed for this purpose is an isocyanate-modified polyester. Such polymers have been prepared by reacting a dibasic acid, e.g., adipic acid, with a molar excess of polyhydric alcohol, e.g., a glycol, to form a hydroxyl-terminated polyester. The polyester is then reacted with a molar excess of diisocyanate, e.g., p-tolylene diisocyanate, to form an isocyanate-terminated prepolymer. Compounding of the propellant composition is effected by mixing the prepolymer with an inorganic oxidizer such as amonium perchlorate and a curing agent such as an alkanolamine. The propellant composition in fluid form is charged into a motor casing and cured in situ therein to form a solid propellant grain.

The present invention is concerned with an improvement in isocyanate-terminated prepolymers of the foregoing type. It has been found that the previously proposed prepolymers of this type have been subject to a number of disadvantages. Thus they have a tendency to absorb water from the atmosphere and the absorbed water reacts with the isocyanate groups of the prepolymer, thereby reducing the number of such groups available for the curing reaction after the propellant composition has been cast. Also when such prepolymers are mixed with the necessary quantity of oxidizer and curing agent, the viscosity of the mixture is so high as to make it difficult to work with. Moreover, the curing temperature of the polymers is higher than is desirable.

It has now been found that prepolymers of the foregoing general type but substantially improved in respect to water absorbency, viscosity and curing temperature can be obtained by using as the acid component of the polyester a polybasic acid that is a polymer of an unsaturated $C_{18}$ fatty acid such as oleic or linoleic acids. It is known that such fatty acids polymerize to give dimers and trimers containing 36 to 54 carbon atoms respectively. Commercial mixtures containing various proportions of the dibasic acid and tribasic acid are available and can be used satisfactorily in preparing the product of the present invention.

As more particularly described hereafter the polymeric poly-basic acid is condensed with a glycol such as diethylene glycol to form a polyester which is in turn reacted with a diisocyanate to form a prepolymer. Because of the nature of the polybasic acid used, this prepolymer has a substanitally higher ratio of hydrogen to carbon than the previously proposed products of this type, and hence is a better fuel. Although the molecular weight of the acid component of the polyester is substantially greater than that of previous products of this type, it has been found that surprisingly the present prepolymer can be compounded with the oxidizer and other propellant ingredients at least as easily as, and in some compositions more easily than, prior similar prepolymers. Curing can be effected at temperatures as low as 100° F. that is, well below the curing temperatures required with prior isocyanate-modified polyesters. Moreover, the present products are considerably less hygroscopic than prior similar products, and thus the processing problems encountered as a result of the hygroscopic character of the prior products are mitigated.

Curing of the present prepolymers can be effected in general with curing agents of the type previously used for curing isocyanate-modified polyesters. Acceptable cures have been achieved with castor oil, triisopropanolamine and phenyl diethanolamine. The cured products are elastomers which, as indicated hereafter, confer upon the propellant grain in which they are incorporated good tensile and elastic properties.

In order to point out more fully the nature of the present invention, the following examples are given of typical modes of making the present prepolymer and an illustrative method of incorporating such prepolymers in a propellant composition.

*Example 1*

In this example the acid used was a commercial mixture of the dimer and trimer of linoleic acid containing about 75% dimer and 25% trimer. The polyhydric alcohol used was diethylene glycol.

A polyester was prepared by mixing 675 grams (1.0 mole) of the polybasic acid and 159 grams (1.5 moles) of diethylene glycol in a resin kettle. The mixture was heated under a nitrogen atmosphere to 140° to 150° C. and maintained at this temperature under total reflux for about an hour. At the end of the reflux period a partial condenser was connected to the kettle and water was removed from the mixture.

The temperature was then gradually raised to 225° C. over a period of about seven hours. During the first half of this heating period the resin mixture was maintined at atmospheric pressure, whereas during the latter half of the heating period the pressure was gradually reduced to approximately 50 mm. absolute. Analysis of the resulting polyester showed that it had a hydroxyl number of 55.9, an acid number of 1.4, a water content of 0.05% by weight and a molecular weight of about 2000 to 3000.

The polyester as thus prepared was reacted with a molar excess of p-tolylene diisocyanate to form a prepolymer. More particularly 200 grams of the polyester was gradually added to 43.5 grams of the diisocyanate in a resin kettle. The temperature of the resulting mixture was raised to 120° C. over a period of about 12 minutes and this temperature was maintained for approximately one-half hour. Analysis of the resulting prepolymer showed that it had an NCO content of 6.1% by weight.

*Example 2*

A polyester was prepared by reaction of diethylene glycol with a polybasic acid comprising polymers of linoleic acid in the proportions of 96% dimer and 4% trimer. The procedure used in preparing the polyester was the same as that of Example 1 except that the molar ratio of diethylene glycol to polybasic acid was 1.25:1 instead of 1.5:1, and after removal of water, the temperature was raised to 207° C. instead of 225° C.

A resin kettle was charged with 372.7 grams of p-tolylene diisocyanate and 1626 grams of the polyester was added thereto over a period of about 40 minutes at room temperature. Then the temperature was gradually raised to 120° C. over a period of one-half hour and maintained at 120° C. for an additional one-half hour. The resulting prepolymer had an NCO content of 6.13%.

As indicated above, it has been found that the present prepolymers have superior properties as fuel-binders for solid propellants. An illustrative method of incorporating the prepolymer of Example 1 in a solid propellant will now be described. 9.85 parts by weight of the prepolymer and 62.0 parts by weight of finely divided ammonium perchlorate were placed in a mixer and mixed for 30 minutes. A separate mixture was prepared of 20 parts of aluminum powder (Reynolds No. 400) and 8.15 parts of castor oil. The premix of castor oil and aluminum powder was added to the mixer and mixing continued for 15 minutes to a final temperature of 130° to 135° F. The viscosity of the propellant mixture at this temperature was 6,000 to 8,000 poises.

The propellant mixture was de-aerated by causing it to flow through a narrow slit in a metal plate and then cast in a motor casing at 110° to 135° F. Curing of the composition was effected by maintaining it at a temperature of 100° F. for a period of 48 hours, during which period the composition became a rubbery solid. The cured composition had a tensile strength of 150 p.s.i. and a maximum elongation of 114%. Its tear resistance was 28 pounds per inch. It was further found that the composition had the relatively low burning rate of about 0.15 inch per second at 1,000 p.s.i. pressure. Such a low burning rate is a desirable property for many solid propellant applications.

It is, of course, to be understood that the foregoing examples are intended to be illustrative only and that numerous changes can be made in the ingredients, proportions and conditions specifically set forth. This is particularly true of the compounding of the present prepolymer into a solid propellant wherein a wide variety of known compounding techniques may be used. Since isocyanate-terminated prepolymers have been extensively tested as fuel-binders in propellant compositions, it is deemed unnecessary to set forth the variations in compounding ingredients and techniques useful for this purpose.

The present prepolymers have been used as fuel-binders in propellant compositions for several hundred motors which gave highly satisfactory test firings. X-ray examination of the propellant charges of some of the larger test motors indicated that the propellant was remarkably free from faults, such faults being limited to bubbles of perhaps ¼ inch in diameter which do not ordinarily cause trouble in firing. As indicated above, use of the present prepolymers eliminates a number of processing difficulties and generally facilitates the preparation and casting of the propellant composition.

I claim:

1. The method of making an isocyanate-terminated prepolymer which comprises reacting with a molar excess of diethylene glycol a polybasic acid which is essentially a mixture of the dimer and trimer of an unsaturated $C_{18}$ fatty acid which is predominately oleic acid to form a polyester having free hydroxyl terminals, and then reacting said polyester with a molar excess of p-tolylene diisocyanate to form said prepolymer.

2. An isocyanate-terminated prepolymer made by the method of claim 1.

3. The method of making an isocyanate-terminated prepolymer which comprises reacting with a molar excess of diethylene glycol a polybasic acid which is a mixture of the dimer and trimer of an unsaturated $C_{18}$ fatty acid which is predominately linoleic acid to form a polyester having free hydroxyl terminals, and then reacting said polyester with a molar excess of p-tolylene diisocyanate to form said prepolymer.

4. An isocyanate-terminated prepolymer made by the method of claim 3.

References Cited by the Examiner

UNITED STATES PATENTS

| 2,905,652 | 9/1959 | Best et al. | 260—22 |
| 2,969,338 | 1/1961 | Parker | 260—22 |

LEON J. BERCOVITZ, *Primary Examiner.*

ALLEN M. BOETTCHER, LEON D. ROSDOL, ROGER L. CAMPBELL, *Examiners.*

M. AVIN, J. W. WHISLER, *Assistant Examiners.*